(12) United States Patent
Wang

(10) Patent No.: US 7,517,106 B1
(45) Date of Patent: Apr. 14, 2009

(54) FLAGPOLE LAMP OF A VEHICLE HEAD

(76) Inventor: Ming-Cheng Wang, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 11/960,644

(22) Filed: Dec. 19, 2007

(51) Int. Cl.
*A45B 3/02* (2006.01)

(52) U.S. Cl. ............... 362/102; 362/222; 362/493; 362/540; 362/545; 362/800

(58) Field of Classification Search ............ 362/102, 362/493, 540, 545, 800, 222; 248/127, 218.4, 248/230.1
See application file for complete search history.

(56) References Cited

U.S. PATENT DOCUMENTS

| | | | | |
|---|---|---|---|---|
| 3,487,360 | A  * | 12/1969 | Thompson | 340/472 |
| 6,345,464 | B1 * | 2/2002 | Kim et al. | 42/114 |
| 6,948,829 | B2 * | 9/2005 | Verdes et al. | 362/227 |
| 7,119,679 | B1 * | 10/2006 | Crom | 340/539.32 |
| 7,172,308 | B1 * | 2/2007 | Su | 362/191 |
| 2006/0152941 | A1 * | 7/2006 | Chiang | 362/540 |
| 2008/0137329 | A1 * | 6/2008 | Fee | 362/231 |

* cited by examiner

*Primary Examiner*—Sharon E Payne
*Assistant Examiner*—Mary Zettl

(57) ABSTRACT

A flagpole lamp of a vehicle head consists of a pole, a connecting member, a circuit board, a positioning base, a waterproof washer and a pole head. The connecting member is fixed on the pole, accommodating the circuit board, the positioning base and the waterproof washer. The circuit board has at least one luminous body inserted through a through hole bored on the positioning base. The pole head is mounted on the connecting member, formed as a light-transmitting object to emit a colored light to enable the driver to clearly see the corners and the position of a vehicle head while turning on headlights, and to flashily emit another colored light to apparently tell drivers of other cars running beside and behind the intension of the driver while turning on directional lights, so as to enhance traffic security.

5 Claims, 4 Drawing Sheets

FLAGPOLE LAMP OF A VEHICLE HEAD

BACKGROUND OF THE INVENTION

1. Field of the Invention

This invention relates to a flagpole lamp of a vehicle head, particularly to one that can let a driver clearly see the corners and the position of a vehicle head by emitting a colored light at the same time while turning on headlights, and that can flashily emit another colored light to apparently tell other drivers the intension of the driver while turning on directional lights, so as to enhance traffic security.

2. Description of the Prior Art

Commonly, two sides of a vehicle's head are respectively installed with a conventional flagpole used for a driver to clearly see the corners and the position of a car's head to avoid accidental collisions. However, the conventional flagpole is usually made of metal, just used to indicate the width of the head and unable to be clearly seen in the night. Therefore, the conventional flagpole can not effectively play the role.

SUMMARY OF THE INVENTION

The objective of this invention is to offer a flagpole lamp of a vehicle head that can let a driver clearly see the corners and the position of a vehicle head by emitting a colored light at the same time while turning on headlights, and that can flashily emit another colored light to apparently tell drivers of other cars running beside and behind the car the intension of the driver while turning on directional lights, so as to enhance traffic security.

The main characteristic of the invention includes a pole, a connecting member, a circuit board, a positioning base, a waterproof washer and a pole head. The connecting member is fixed on the pole, provided with a laddered chamber formed inside it and a through hole formed in the bottom of the laddered chamber. The circuit board is installed in the laddered chamber of the connecting member, provided with at least one luminous body and a power line connected to the circuit board. The positioning base is fixed on the circuit board inside the laddered chamber of the connecting member, provided with at least one through hole. The waterproof washer is located on the positioning base inside the laddered chamber of the connecting member. The pole head is mounted on the connecting member, formed as a light-transmitting object.

BRIEF DESCRIPTION OF DRAWINGS

This invention is better understood by referring to the accompanying drawings, wherein.

DETAILED DESCRIPTION OF THE PREFERRED EMBODIMENT

Figure 1:
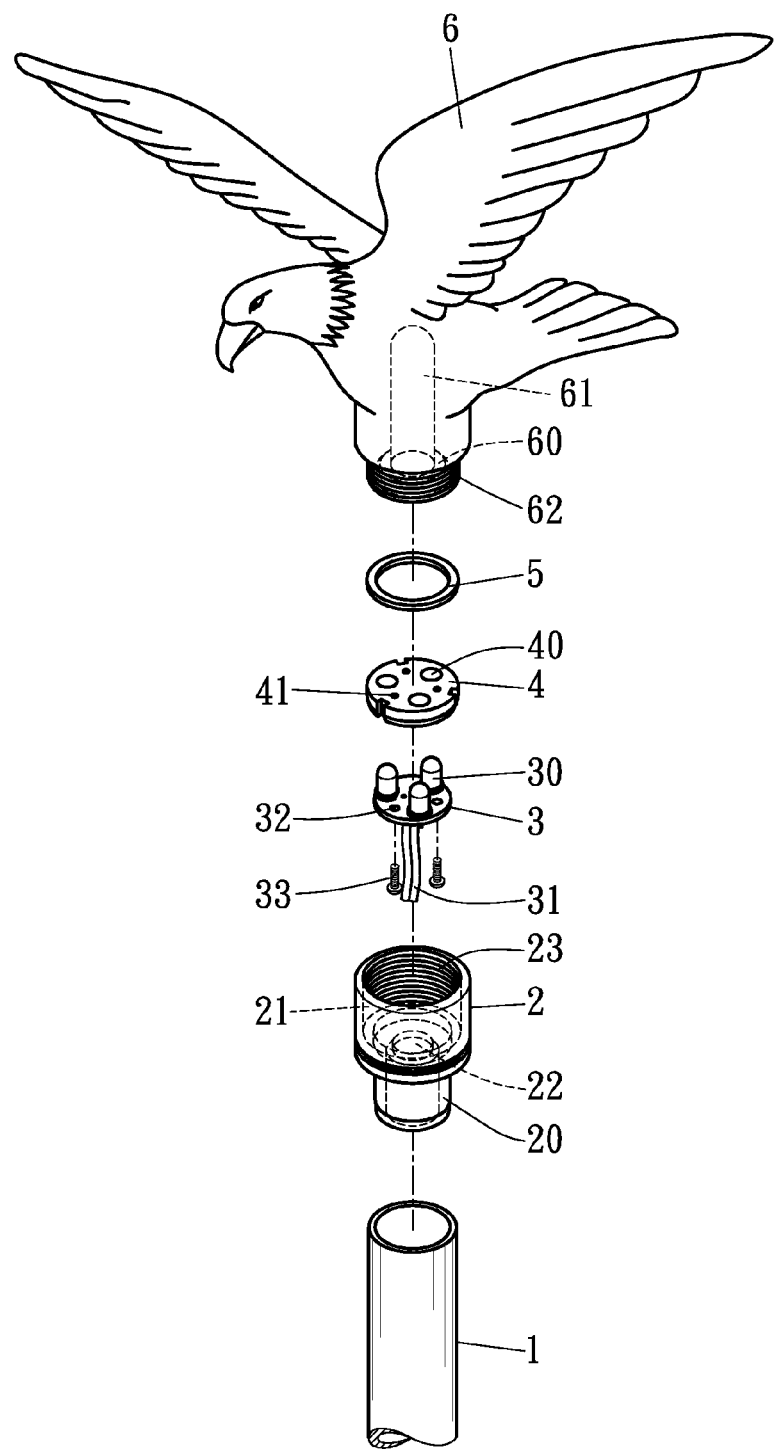
FIG. 1 is an exploded perspective view of a preferred embodiment of a flagpole lamp of a vehicle head in the present invention.
Figure 2:
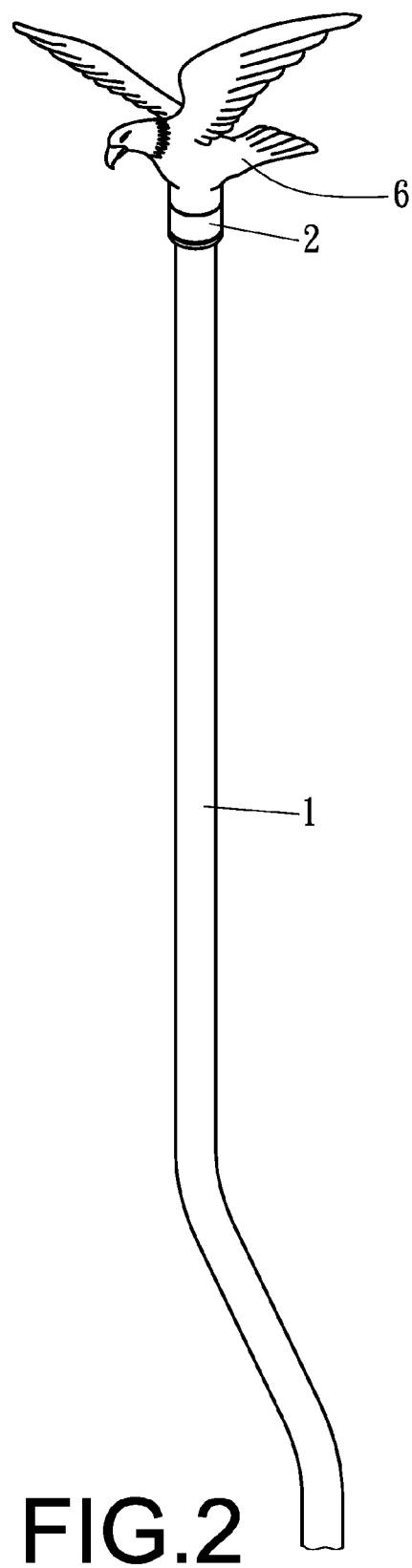
FIG. 2 is a perspective view of the preferred embodiment of a flagpole lamp of a vehicle head in the present invention.
Figure 3:
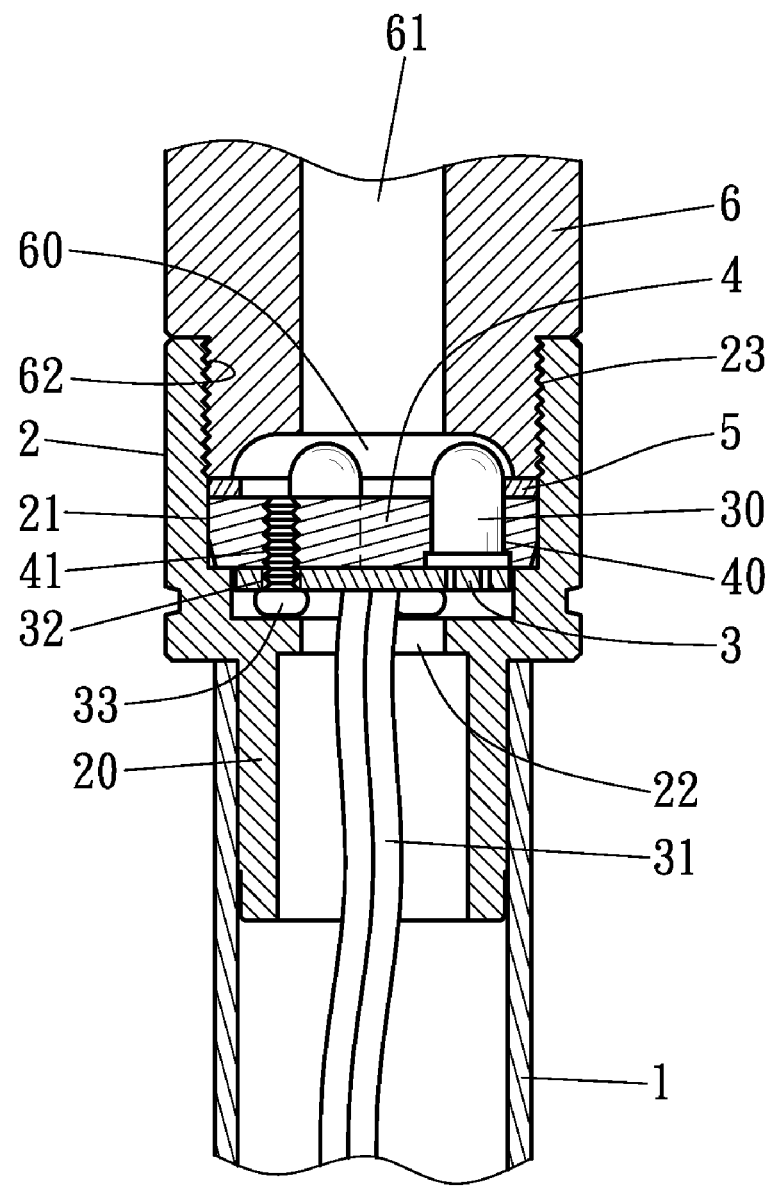
FIG. 3 is a cross-sectional view of the preferred embodiment of a flagpole lamp of a vehicle head in the present invention.

As shown in FIGS. 1~3, a preferred embodiment of a flagpole lamp of a vehicle head in the present invention consists of a pole 1, a connecting member 2, a circuit board 3, a positioning base 4, a waterproof washer 5 and a pole head 6.

The pole 1 is formed tubular.

The connecting member 2 is fixed on the pole 1, provided with a projection 20 formed at its lower portion, a laddered chamber 21 formed inside it, a through hole 22 formed in the bottom of the laddered chamber 21, and female threads 23 formed around the inner wall of the laddered chamber 21.

The circuit board 3 is installed in the laddered chamber 21 of the connecting member 2, provided with at least one luminous body 30 such as a light emitting diode (LED) able to alter its light color, a power line 31 connected to the circuit board 3, and at least one through hole 32 each inserted with a screw 33.

The positioning base 4 is also installed in the laddered chamber 21 of the connecting member 2 and fixed on the circuit board 3, provided with at least one through hole 40 and at least one threaded hole 41.

The waterproof washer 5 is located on the positioning base 4 inside the laddered chamber 21 of the connecting member 2.

The pole head 6 is mounted on the connecting member 2, formed as a light-transmitting object with a design such as an eagle, and provided with a recess 60 formed in its bottom, a chamber 61 formed inside it and male threads 62 formed around its lower outer surface.

In assembly, as shown in FIGS. 1~3, firstly place the circuit board 3 under the positioning base 4 with the at least one luminous body 30 of the circuit board 3 extended up through the at least one through hole 40 of the positioning base 4. Secondly, extend the at least one screw 33 through the at least one through hole 32 of the circuit board 3 to keep it engaged with the at least one threaded hole 41 of the positioning base 4, so as to fix the positioning base 4 on the circuit board 3. Thirdly, place the circuit board 3 and the positioning base 4 in the laddered chamber 21 with the power line 31 of the circuit board 3 passed out through the through hole 22 of the connecting member 2. Fourthly, put the waterproof washer 5 in the laddered chamber 21 and locate it on the positioning base 4. Fifthly, mount the pole head 6 on the connecting member 2 by engaging the male threads 62 with the female threads 23 of the connecting member 2 to keep the pole head 6 fixed on the connecting member 2 firmly with the bottom of the pole head 6 pressing on the waterproof washer 5 and with the top of the at least one luminous body 30 staying in the chamber 60 of the pole head 6. Finally, insert the projection 20 of the connecting member 2 firmly into the pole 1, thus finishing the whole assembly.

Figure 4:
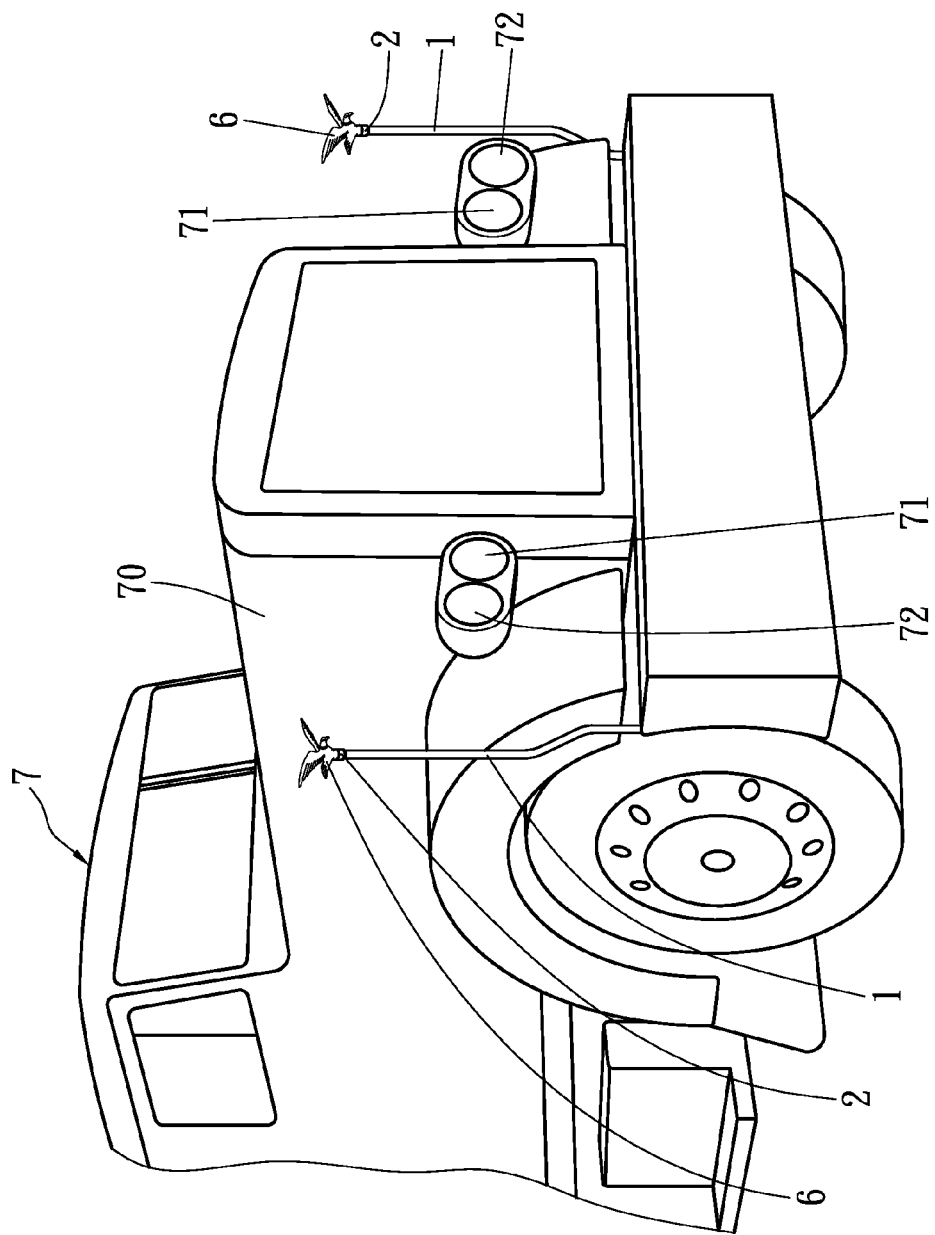
FIG. 4 is a schematic view of the preferred embodiment of a flagpole lamp of a vehicle head in the present invention, showing it being lighted up while turning on headlights.

In using, as shown in FIG. 4, the pole 1 is positioned respectively at two corners of a vehicle head 70 of a vehicle 7, with the power line 31 of the circuit board 3 connected to a lamp control circuit of the vehicle 7. When a driver turns on headlights 71 (main ones or small ones) of the vehicle 7 in the night or in the dark, the at least one luminous body 30 in the laddered chamber 21 of the connecting member 2 can be simultaneously actuated to emit a colored light (such as blue light) capable of transmitting out of the pole head 6 to keep the pole head 6 fully shined, so that the driver can clearly see the corners and the position of the vehicle head 70 to prevent any collisions from happening. Also, the pole head 6 has an aesthetic figure. Moreover, when a driver intends to make a turn with the directional lights turned on, the at least one luminous body 30 in the laddered chamber 21 of the connecting member 2 can be as well automatically actuated to flashily emit another colored light (such as orange one) capable of transmitting out of the pole head 6 to attract attention of drivers of other cars running beside and behind the car 7 for enhancing traffic security.

While the preferred embodiment of the invention has been described above, it will be recognized and understood that various modifications may be made therein and the appended claims are intended to cover all such modifications that may fall within the spirit and scope of the invention.

What is claimed is:

1. A flagpole lamp of a vehicle head comprising: a pole (1), a connecting member (2), a circuit board (3), a positioning base (4), a waterproof washer (5) and a pole head (6); wherein
   the connecting member (2) is fixed on the pole (1), a laddered chamber (21) formed inside it, a through hole (22) formed in the bottom of the laddered chamber (21), and female threads (23) formed around the inner wall of the laddered chamber (21);
   the circuit board (3) is installed in the laddered chamber (21) of the connecting member (2), provided with at least one luminous body (30) able to alter light color thereof,
a power line (31) connected to the circuit board (3), and at least one through hole (32) each inserted with a screw (33);
   the positioning base (4) is installed in the laddered chamber (21) of the connecting member (2) and fixed on the circuit board (3), provided with at least one through hole (40) and at least one threaded hole (41);
   the waterproof washer (5) is located on the positioning base (4) inside the laddered chamber (21) of the connecting member (2);
   the pole head (6) is mounted on the connecting member (2), formed as a light-transmitting object, and male threads (62) formed around its lower outer surface; and
   wherein in assembly, firstly the circuit board (3) is placed under the positioning base (4) with the at least one luminous body (30) of the circuit board (3) extended up through the at least one through hole (40) of the positioning base (4); then, the at least one screw (33) extends through the at least one through hole (32) of the circuit board (3) to keep it engaged with the at least one threaded hole (41) of the positioning base (4), so as to fix the positioning base (4) on the circuit board (3); next, the circuit board (3) and the positioning base (4) are placed in the laddered chamber (21) with the power line (31) of the circuit board (3) passing through the through hole (22) of the connecting member (2); then the waterproof washer (5) is installed within the laddered chamber and located upon the positioning base (4); and then the pole head (6) is mounted on the connecting member (2) by engaging the male threads (62) with the female threads (23) of the connecting member (2) to keep the pole head (6) fixed on the connecting member (2) firmly with the bottom of the pole head (6) pressing on the waterproof washer (5); thus finishing the whole assembly.

2. The flagpole lamp of a vehicle head as claimed in claim 1, wherein said pole is formed tubular, and said connecting member is provided with a projection formed at its lower portion for being plugged in said pole.

3. The flagpole lamp of a vehicle head as claimed in claim 2, wherein said pole head is provided with a recess formed in a bottom thereof and a chamber at an upper side of the recess and communicating to the recess; the recess is wider than the chamber; and in assembly, a top of the at least one luminous body is stayed in the recess of the pole head.

4. The flagpole lamp of a vehicle head as claimed in claim 3, wherein the pole head (60) has an aesthetic figure.

5. The flagpole lamp of a vehicle head as claimed in claim 4, wherein the pole head (60) has a shape of a bird.

* * * * *